June 14, 1938.  H. S. JANDUS  2,120,362
CONSTRUCTION OF BRAKE LEVERS
Filed April 17, 1937
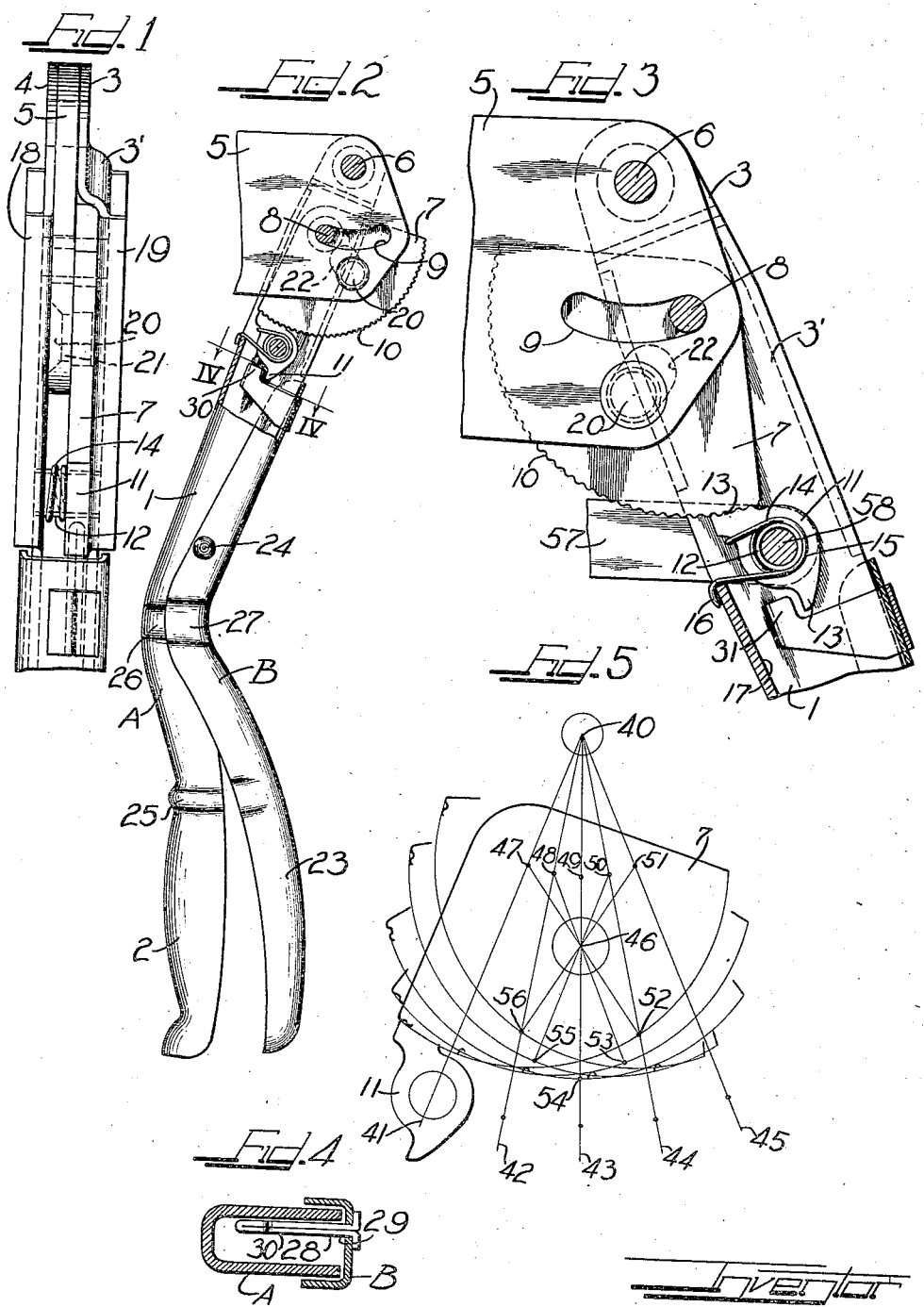
Inventor
HERBERT S JANDUS Patented June 14, 1938

2,120,362

UNITED STATES PATENT OFFICE 2,120,362

CONSTRUCTION OF BRAKE LEVERS

Herbert S. Jandus, Detroit, Mich., assignor to Oakes Products Corporation, North Chicago, Ill., a corporation of Michigan Application April 17, 1937, Serial No. 137,418

2 Claims. (Cl. 74—536)

The invention relates to construction of brake lever and more particularly to a brake lever construction wherein the ratchet is formed on an oscillatable sector or quadrant which is pivoted to the lever and which sector is given differential swinging movement with respect to the lever as the latter is swung in use.

An object of the present invention is to provide a brake lever construction, particularly for automotive vehicles, wherein a finely, graduated ratchet adjustment is achieved.

Another object of the present invention is to provide a brake lever construction wherein a ratchet sector or quadrant is pivotally carried by the lever and is rocked in angular direction with respect to the swing of the lever by means of a fixed member carried by the lever support, which member constitutes a point of rocking movement for the sector.

A further object of the present invention is to provide a brake lever construction of the pawl and ratchet type, wherein the ratchet and pawl are rockably carried by the lever and wherein the ratchet sector or quadrant is rocked about its pivotal connection to the lever as the lever is swung in use, together with means for swinging the ratchet sector.

Another and still further object of the present invention is to provide a brake lever construction of the pawl and ratchet type wherein a smaller ratchet quadrant or sector may be employed to reduce the manufacturing cost of the same.

The above, other, and further objects of the present invention will be apparent from the following description and accompanying drawing.

The accompanying drawing illustrates a construction of brake lever embodying the principles of the present invention, and the views thereof are as follows:

Figure 1 is a fragmental end elevational view of the illustrated form of lever construction.

Figure 2 is a view, partially in side elevation and partially in section, showing the lever of the present invention with the various parts in positions occupied when the lever is in "off" position.

Figure 3 is an enlarged view, partially in section and partially in elevation, of the lever of Figure 2 showing the relationship of the parts when the lever is in "set" position.

Figure 4 is an enlarged horizontal sectional view taken substantially in the plane indicated by line IV—IV of Figure 2.

Figure 5 is a diagrammatic view showing the various positions through which the ratchet sector or quadrant is swung, from its position of Figure 2 to its position of Figure 3, as the lever is swung from its "off" position to its "set" position.

The drawing will now be explained.

The lever A is suitably fashioned from flat metal stock to provide a shank portion 1, a handle portion 2, and spaced parallel legs 3 and 4. The shank and handle portions of the lever are channel shape in cross section, with the legs 3 and 4 formed as extensions of the walls of the shank portion. The lever is bent, between the shank and handle portions so that when installed as a lever of the dash type there will be sufficient clearance with respect to the lower margin of the instrument board, to permit ready access to the handle or grip portion of the lever to actuate it.

A support 5, herein illustrated as comprising a plate, is suitably secured in position behind the instrument board of an automotive vehicle. To this end the upper ends of the legs 3 and 4 are pivoted as at 6, thus constituting the axis of swinging movement of the lever. The legs 3 and 4 are shown as straddling the plate 5.

A ratchet sector or quadrant 7 is pivoted to the legs 3 and 4 of the lever by means of a pivot pin 8 which passes through an arcuate slot 9 formed in the support 5, to permit ready swing of the lever. An arcuate edge of the sector 7 is provided with teeth 10 constituting the ratchet.

Pivoted to the lever, in position to cooperate with the ratchet teeth 10 of the sector 7, is a pawl 11. This pawl is pivoted by means of a tubular sleeve 12 with its ends in suitably disposed openings in the legs of the lever.

The pawl is provided with a series of teeth 13 for making latching engagement with the ratchet teeth 10 of the sector 7.

The contours of the teeth of the pawl as well as of the ratchet are shown as of wave form.

The pawl is maintained in latched engagement with the sector by means of a spring 14 having a part pivoted about the pawl, and a bight portion 15 bent about the tubular pivot 12, and end portions 16 which hook over the end of the web 17 of the lever, which terminates adjacent the position of the pawl.

The leg 3, is illustrated as having an offset portion 3' to afford space between the plate 5 and the inner surface of the leg to accommodate the sector 7 and the pawl 11.

Preferably the margins of the legs are outturned as at 18 and 19 to add strength to the legs.

Secured in a suitable countersunk opening in the plate 5, and within the limits of swing of the sector 7, is a pin 20 having a countersunk head to fit the countersunk opening, and a stud portion 21 which works within an elongated slot 22 formed in the sector 7. The length of the slot 22 is radial, with respect to the pivot 8.

The pin 20 is engageable with the sector 7 between the pivotal connection of the sector to the lever and its ratchet surface, as may be readily observed in the drawing.

As the lever is swung from its "off" position, Figure 2, to its "set" position, Figure 3, the pivot 8 travels in an arcuate path and moves through the arcuate recess 9 formed in the support 5, because of the fact that the pin 20 slidably engages the sector 7, by means of the stud 21 and the slot 22, the sector 7 is rocked about its pivotal connection 8 with the lever, in angular direction counter to the direction of angular movement of the lever, thus moving the ratchet teeth 10 past the teeth of the pawl, in a direction opposite that to the direction of movement of the pawl with the lever.

Because of the relative movement occurring between the ratchet teeth 10 and the teeth on the pawl, angular movement of the lever may be slight, to cause relative travel between the pawl teeth and ratchet teeth, of greater amount than that represented by the angular movement of the lever.

The construction just described enables a fine adjustment to be achieved of lever setting.

It is a recognized fact that an automotive brake lever, when approximately at the end of its travel in setting direction, is under a load of considerable amount due to the pull necessarily imposed on the brake rigging to apply the brakes. Sometimes in order to move the lever to the desired notch of the sector, to effectively set the brakes, strength in excess of that possessed by the operator may be required. Under such conditions, that is with the operator lacking sufficient strength to move the lever to a point where the brakes are securely set, braking efficiency has not been attained.

With the construction of the lever of the sort herein described, but a slight movement of the lever is required to effect final latching engagement of the pawl and ratchet where the full braking effect is achieved. This is because of the fact that the ratchet is moved relatively to the pawl and thus a finer adjustment of setting results.

For releasing the pawl from latched engagement with the ratchet, an actuating member B is fashioned by stamping or other suitable process, from flat metal, to provide a member which is substantially channel shaped in cross section for the major portion of its length, and with a handle portion or grip portion 23 disposed adjacent the handle portion 2 of the lever. The actuating member B is pivoted at 24 to the lever, with the walls of the actuating member overlapping the walls of the lever member and with their webs in opposition.

Such a construction reduces the cost of manufacture of the lever as the various parts do not have to be finished to an extent necessary where a tubular lever is employed with a short actuating member for releasing the pawl.

For guiding the relative movement between the handle portions of the lever and actuating members, A and B, the lever is formed with a recess 25 in the walls and web of the lever body, which recess provides a bulge defining the upper end of the grip portion of the lever.

For maintaining the actuating member B, in normal position, a spring, not shown, is interposed between the webs of the lever A and the actuating member B, and lies within offset portions 26 and 27 formed in the walls of the lever A and the actuating member B, which may be observed in Figure 2. The offset portion 27 overlaps the offset portion 26, these portions serving as guides for the scissors-like action of the actuating member B and the lever body A when the lever is operated to release the pawl from latched engagement with its ratchet.

The upper end of the actuating member B carries a hook 28 which is illustrated as fashioned from flat metal, and which is passed through an aperture 29 in the web of the actuating member. The hook 28 is formed with an upstanding nose 30 positioned to contact a tail piece 31 of the pawl 11 when the actuating member B is squeezed to move its handle portion 23 towards the grip portion 2 of the lever thus moving the upper end of the actuating member B to the right, as viewed in Figures 2 and 3. Such movement trips the pawl from latched engagement with the ratchet and permits the return of the lever from its set position to its "off" position.

In moving the lever from "off" position to "set" position, it is moved in counterclockwise direction as viewed in the drawing. Such swinging movement of the lever causes swinging movement of the ratchet sector 7 in clockwise direction.

When the lever is moved from "set" position to "off" position, it is swung in clockwise direction, as viewed in the drawing, in which event the ratchet sector 7 swings in counterclockwise direction.

The relationship of the pivotal connection 8 of the ratchet sector 7 to the lever, and the pin 20 supported in the support 5 for serving as a center on which the sector 7 rocks, is such that the speed of swing or rock of the sector 7 is in excess of the speed or rate of swing of the lever as the latter is moved by the vehicle operator in either direction.

The swinging of the ratchet sector 7 creates a differential movement with respect to the pawl and a condition wherein the amplitude of swing of the lever from crest to crest of adjacent teeth of the ratchet is less than the horizontal projection of the pitch of the ratchet teeth. This means that to move the lever from one tooth to the next of the ratchet the amplitude of movement of the lever is slightly less than the pitch of the ratchet teeth.

The formation of the intermeshing teeth of the ratchet 10 and of the pawl, in wave form, enables utilization of teeth which have small depth and pitch, thereby making it possible to have greater amount of metal in the teeth themselves thus adding to the strength and ruggedness of the ratchet and pawl and prolonging the operating life of these parts.

Because of the limited space available behind the instrument board of an automotive vehicle, wherein to install a dash type of emergency brake lever, the maximum limit of swing of said lever is not in excess of 45°.

It will be observed that the amplitude of swing of the sectors 7 is in excess of 45°.

Figures 2 and 3 of the drawing show the position of the lever at the limit of its travel of the swing of 45°, and the ratchet sector 7 at its limits of swing, or an amplitude in excess of 45°.

Figure 5 is a diagrammatic representation of the successive positions occupied by the sector 7 as the lever is swung from its "off" position of Figure 2 to its "set" position of Figure 3.

In this figure, 40 is the pivotal point or fulcrum of the lever connected to the support 5.

In Figure 5, the line 40—41 represents the center line of the shank of the lever when in its zero or "off" position. The line 40—45 is a center line of the lever when it has been moved to its fully "set" position or an angular distance of substantially 45°. The lines 40—42, 40—43, and 40—44, represent various positions occupied by the center line of the lever as it is swung from its "off" position to its fully "set" position and are arranged in this figure equidistantly spaced.

The point 46 is the center of the pin 20, which is a fixed point. The points represented by the reference characters 47, 48, 49, 50, and 51 represent the axis of the pin 8 in various positions of this axis as the lever is swung as heretofore described.

The line 47—52 is a straight line from the axis of the pin 8 through the axis of the pin 20 and at the point 52 terminating in the arcuate ratchet margin of the sector and representing a position of the point 52 when the lever is in its "off" position.

The other lines 48—53, 49—54, 50—55, and 51—56, represent successive positions of this line as the sector is rocked about its pivot 8 and the pin 20 as the lever is swung from the position of Figure 2 to the position of Figure 3.

It will be observed that the ratchet teeth 10, of the sector 7, are moved past the teeth of the pawl 11 in counterdirection to that of the swing of the pawl with the lever, to effectuate fine adjustment of the lever in any latched position.

It is to be remembered that the ratchet sector 7 swings about its pivot 8 and also moves with the lever so that the amplitude of swing of the sector is greatly in excess of the amplitude of swing of the lever.

By means of the novel means for the actuation of the ratchet sector 7, as herein described, it is possible to secure fine adjustment of the lever, with low manufacturing cost, as the lever as herein described may be readily manufactured and assembled with a minimum amount of labor.

The manner of swinging the ratchet sector 7 as herein described is another factor in the economical production of the lever of the present invention.

A yoke or clevis 57 is connected to the lever A by means of a pivot pin 58 inserted in the tubular pivot member or sleeve 12 of the pawl 11. To the yoke 57 connection is made with the brake rigging of the vehicle.

The ratchet teeth 10 have been omitted from the representation of the sector 7, in Figure 1, to enable clearer showing of the relation of the pin 20 to the sector 7.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. An automotive vehicle emergency brake lever construction including a fixed plate, a lever having spaced legs pivoted to and astraddle said plate, said plate having an arcuate slot in it described with the axis of the lever pivot as a center, a pin in said slot having its ends secured in said legs, a ratchet sector rockable on said pin between said lever legs, a pawl pivoted to said lever and between said legs for cooperating with said ratchet sector to latch said lever in adjusted position, said sector having a slot in it, and said plate carrying a pin working in said sector slot to rock said sector about its pivot as the lever is swung.

2. An automotive vehicle emergency brake lever construction including a fixed plate as a support, a lever having spaced legs pivoted to and astraddle said plate, said plate having an arcuate slot in it described with the axis of the lever pivot as a center, a pin in said slot having its ends secured in said legs, a sector rockable on said pin between said legs and having a clutching surface, a clutch member carried by said lever and between said legs for cooperating with said clutching surface to hold said lever in adjusted position, said sector having a slot in it, said plate carrying a pin working in said sector slot to rock said sector slot about its pivot as the lever is swung, and means carried by the lever for disengaging said clutch member from holding engagement with said clutching surface.

HERBERT S. JANDUS.